United States Patent Office 3,350,327
Patented Oct. 31, 1967

3,350,327
CATION EXCHANGE RESINS
Siegfried Aftergut, Schenectady, N.Y., assignor to General
Electric Company, a corporation of New York
No Drawing. Filed Mar. 26, 1964, Ser. No. 355,107
3 Claims. (Cl. 260—2.2)

This invention relates to the production of cation exchange resins. More particularly, it relates to the composition of resins and membranes, and the process for producing such materials, utilizing polymer segments, having ether linkages, cross-linked by methylene bridges.

Cation exchange membranes formed from sulfonated ethers cross-linked by methylene bridges have been known in the prior art. For example, resins containing alkaryl ethers are shown in the U.S. patents to Haagen—2,696,866, Clarke—2,756,202, and Haagen et al.—2,882,247. In each case, however, the alkaryl ethers were either monoethers, or were diethers where the central group of the molecules was substituted aryl nucleus. Resins formed from such compounds suffer from a variety of disadvantages. Among these disadvantages are the requirement for excessive sulfonation, the requirement for large amounts of cross-linking agents, and the inherent rigidity of the final product. Problems of increased cost, formation, and support are necessary results of utilizing such compounds in the formation of cation exchange resins and membranes.

It has been discovered, in accordance with this invention, that the utilization of a sulfonated polyether, where the central segment of the compound is an oxyalkylene group, provides a cation exchange resin overcoming the above-mentioned disadvantages. As a result neither excessive cross-linking nor excessive sulfonation are necessary. Such a resin may be formed into a flexible membrane in which the problems of rigidity, and the corollary problems of support and breakage are essentially eliminated.

It is one object of this invention to produce an internally plasticized cation exchange resin which has increased flexibility.

It is a further object of this invention to provide a method for producing a more flexible cation exchange resin, the additional flexibility being provided by internal plasticization, so that only a reduced degree of polymerization is necessary.

It is a still further object of this invention to produce a cation exchange resin having a lower shrinkage factor on dehydration.

Briefly, this invention involves the utilization of an alkaryl polyether having the formula

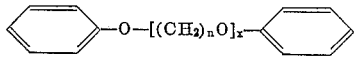

where $n$ is an integral number greater than 1 and $x$ is an integral number greater than 0. Such a polyether is sulfonated by reaction with a compound releasing units of the formula

—SO$_3$H such as concentrated sulfuric acid, oleum, or chlorosulfonic acid. The sulfonated polyether which has the structure

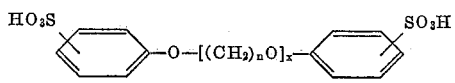

is subsequently polymerized and cross-linked using an aldehyde-releasing substance, such as paraformaldehyde which provides methylene bridges. The reaction product is placed in a mold, which in one embodiment, allows the direct formation of a membrane, and cured to complete the cross-linking reaction.

The purpose of the oxyalkylene group between the terminal phenyl group is, in particular, as an agent to bond the phenyl groups which contain the ion exchanging sulfonic acid radicals. This function allows a smaller degree of polymerization and, thus, provides for greater flexibility in the final resin and membrane. However, the oxyalkylene group also serves to provide a degree of internal plasticization to the resin and membrane, thus additionally improving the flexibility of the final product. A corollary advantage of the increased flexibility of the membrane is a smaller shrinkage factor on dehydration.

The internal oxyalkylene group may be selected from any oxyalkylene meeting the generic formula $$[(CH_2)_nO]_x$$

where $n$ and $x$ are as previously defined. Particularly, oxyalkylenes having the formula

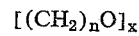

CH$_2$CH$_2$O and

—CH$_2$CH$_2$—O—CH$_2$CH$_2$O—

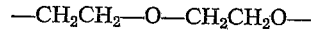

are useful in the production of the cation exchange resins and membranes of the present invention. However, the oxyalkylene linkage may be longer chain ethylene oxide, may be mono- or poly-propylene oxide, or other monomeric or polymeric alkylene oxide chains.

As the alkylene oxide chain becomes longer, increased flexibility is provided, and less polymerization bonding with aldehydes is necessary. However, since the ion exchange groups are present only on the terminal phenyl radicals, the ion exchange capacity of the final resin and membrane is correspondingly decreased. The ion exchange capacity, as used here, is the number of milliequivalents of ionizable material per gram of dry resin. Thus, $$CEC = \frac{meq.}{W}$$

where CEC is the cation exchange capacity in milliequivalents per gram of resin and meq. is the number of milliequivalents of cations exchanged by W grams of dry resin. Thus, the cation exchange capacity is the same as the number of milliequivalents of ionizable material per gram of dry resin. As the cation exchange capacity decreases, the ability of the resin to act as an ion exchange membrane correspondingly decreases. The minimum ion exchange capacity which may be tolerated in a resin or membrane depends upon the use to which it is put. In some applications, such as in the exchange of cations in preparative organic chemistry, membranes having an ion exchange capacity as low as 0.5 milliequivalent per gram of dry resin are useful. In such a situation, that is where a low exchange capacity is sufficient, the molecular weight of the oxyalkylene group bridging the terminal phenyl groups may be as high as 1000. This molecular weight corresponds, for example, to an oxyethylene chain of about 22 units or an oxypropylene chain of about 17 units. With respect to this invention, there is no practical limit to the length of the alkyl portion of the oxyalkylene chain within the molecular weight limitation.

The aldehyde-releasing substances utilized in cross-linking may be derived from any of those commonly used.

The preferred aldehyde is formaldehyde and may be obtained from materials such as paraformaldehyde, hexamethylenetetramine, and aqueous solutions of monomeric formaldehyde known as formalin. The amount of aldehyde needed, as previously stated, is dependent upon the length of the oxyalkylene chain between the sulfonated terminal phenyl units. When using a monomeric oxyethylene bridge the amount of pure formaldehyde utilized may range from about 8.8 to 24.1 grams per 100 grams of the sulfonated polyether. On the other hand as the oxyalkylene bridge is increased in size and molecular weight, the amount of pure formaldehyde which need be utilized decreases, for example, to about 7.9 to 21.5 grams per 100 grams of ether where the oxyalkylene bridge is dimeric oxyethylene. These ranges correspond to about 1.1 to 3.0 moles of formaldehyde per mole of the ether. A preferred range, regardless of the length of the oxyethylene bridge, is from about 1.5 to 2.5 moles of formaldehyde per mole of ether. Obviously, however, as the molecular weight or chain length of the oxyalkylene bridge increases the weight percent of formaldehyde utilized decreases considerably.

The cross-linked polyether may be molded into membranes simply by casting the reaction mixture between confining supports which are coated with release agents, such as silicone fluids. The dimensions of the membranes are limited only by the dimensions of the supports available, but membranes are generally prepared having at least two dimensions greater than 0.25 inch.

The curing temperature for the final resinous membrane should be in the range of 85 to 95° C. A temperature of 90° C. is normally utilized. The necessary curing temperature varies inversely with the time for curing. Normally, about 1 to 2 hours are necessary to complete the cure of the cross-linked polyether cation exchange resin membrane.

The following are examples of the preparation of the sulfonated polyether and of the resin and membrane formed through the cross-linking of the sulfonated polyether. These examples are provided for purposes of illustration and should not be considered as limiting in any way the full scope of this invention as covered by the appended claims.

*Example 1*

One mole of 1,2-diphenoxyethane and 2 moles of concentrated sulfuric acid were heated for 2 hours at 145° C. The resulting product, essentially 1,2-diphenoxyethane-disulfonic acid, was used without further purification.

*Example 2*

A 20 gm. portion of the reaction product of Example 1 was treated with 8 gm. of a 37% formalin solution. The resulting mixture was cast between 2 glass plates and heated for 2 hours at 90° C. A membrane was obtained having an ion exchange capacity of 2.9 milliequivalents per dry gram. The specific resistivity of the fully-hydrated membrane was about 7.5 ohm-cm.

*Example 3*

A 20 gm. portion of the sulfonated diphenoxyethane reaction product formed in Example 1 was mixed with 8.8 parts of a 37% formalin solution, cast between glass plates, and cured under the same conditions described in Example 2. A membrane was obtained having a specific resistivity in the fully-hydrated state of about 9.6 ohm-cm.

Membranes which are not fully hydrated have a tendency to shrink as the water of hydration is lost. Further, increased electrical resistivity accompanies the dehydration of an ion-exchange membrane. Tests were performed to determine the amount of shrinkage and the increase in electrical resistivity on dehydration of the membrane of this example. The membrane was conditioned for 2 days at the relative humidities shown in the table prior to testing of the specific resistivity and percent shrinkage. The results measured are as follows:

TABLE 1

| Relative Humidity, percent | Specific Resistivity, ohm-cm. | Linear Shrinkage, percent |
|---|---|---|
| 100 | 9.2–10.0 | 0 |
| 87 | 12–13 | 3 |
| 71 | 42–56 | 10–11 |
| 51 | 113–124 | 15–16 |

Both the increase in resistivity and the shrinkage shown above are small when compared to membranes available in commerce. Presently available membranes, under the same test conditions, show an increase in resistivity from about 90 ohm-cm. at 100% relative humidity to about 180 ohm-cm. at 87% relative humidity, a two-fold increase, and linear shrinkage of 4–10% at 87% relative humidity.

*Example 4*

A resin having even greater flexibility than those formed in Examples 2 and 3 was prepared in this example utilizing a dimeric oxyethylene bridge between the terminal phenyl groups. The polyether having the formula

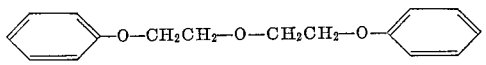

was sulfonated in the following manner. A mixture of 165 gm. of the bis-(2-phenoxyethyl) ether and 127.5 gm. of 96% sulfuric acid was heated with stirring for 2 hours at 120° C. The product obtained was used without further purification. A 20 gm. portion of the reaction product was mixed with 7.8 gm. of 37% formalin and the mixture was cast between glass plates. This casting was cured for 2 hours at 90° C. and the membrane obtained was thoroughly rinsed with distilled water. In the fully-hydrated state, the specific resistivity measured 17 ohm-cm.

The cation-exchange materials formed in accordance with this invention are useful in any application in which cation-exchange resins and membranes are utilized. For example, these membranes may be used as the electrolyte in fuel cells and as the membrane is electrodialysis cells. They are useful in the desalination of water, purification of radioactive wastes, desalination of sugar juices, and preparative organic chemistry. Additionally, the resins may be formed into pellets, rods, bars, etc., for use in the ion exchange and purification processes in which ion exchange resins are generally used.

While specific embodiments of the invention have been shown and described, the invention should not be limited to the particular products shown. It is intended, by the appended claims, to cover all modifications within the spirit and scope of this invention.

What is claimed as new and desired to be secured by Letters Patent of the United States is:

1. A cation exchange resin formed by the process comprising reacting a first compound having the formula:

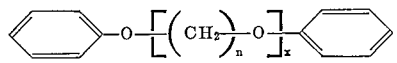

where $n$ is an integral number chosen from the group consisting of 2 and 3 and $x$ is an integral number greater than zero chosen to yield a molecular weight of the oxyalkylene group as high as 1000, with a second compound chosen from the group consisting of concentrated sulfuric acid, oleum, and chlorosulfonic acid, to produce a sulfonated form of said first compound, and reacting said sulfonated form with an aldehyde-releasing compound chosen from the group consisting of formaldehyde, paraformaldehyde, hexamethylenetetramine and formalin to polymerize and cross-link said polymers, said aldehyde releasing compound being introduced in a proportion to introduce from 1.1 to 3.0 moles of formaldehyde per mole of said sulfonated first compound, and curing for a period of from 1 to 2 hours at a temperature in the range of from 85 to 95° C. to produce said cation exchange resin.

2. The product of claim 1 wherein said released aldehyde is formaldehyde and said first compound is

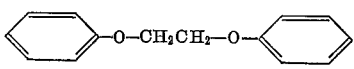

3. The product of claim 1 wherein said released aldehyde is formaldehyde and said first compound is

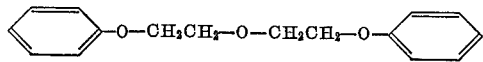

References Cited

UNITED STATES PATENTS

| 2,130,990 | 9/1938 | Coleman et al. | 260—613 |
| 2,535,380 | 12/1950 | Adams et al. | 260—52 |
| 2,692,866 | 10/1954 | Haagen | 260—2.2 |

OTHER REFERENCES

Bjorksten et al.: Polyesters and Their Application, Reinhold Publishing Co., New York, 1956, pages 25–27.

WILLIAM H. SHORT, *Primary Examiner.*

C. A. WENDEL, M. GOLDSTEIN,

*Assistant Examiners.*